(12) United States Patent
Gorczyca et al.

(10) Patent No.: US 7,541,391 B2
(45) Date of Patent: Jun. 2, 2009

(54) SELF-FORMING POLYMER WAVEGUIDE AND WAVEGUIDE MATERIAL WITH REDUCED SHRINKAGE

(75) Inventors: Thomas Bert Gorczyca, Schenectady, NY (US); Renato Guida, Wynantskill, NY (US); Kung-Li Justin Deng, Waterford, NY (US); Hua Xia, Altamont, NY (US)

(73) Assignee: General Electric Company, Niskayuna, NY (US)

( * ) Notice: Subject to any disclaimer, the term of this patent is extended or adjusted under 35 U.S.C. 154(b) by 504 days.

(21) Appl. No.: 11/218,847

(22) Filed: Sep. 2, 2005

(65) Prior Publication Data

US 2007/0054222 A1   Mar. 8, 2007

(51) Int. Cl.
*C08F 2/50* (2006.01)
*C08J 3/28* (2006.01)

(52) U.S. Cl. .............. 522/178; 522/134; 522/166; 522/170; 522/181; 522/114; 522/120; 522/121; 522/129; 522/116; 522/168; 522/169; 522/182; 430/269; 430/270.1; 430/280.1; 430/281.1

(58) Field of Classification Search ............ 522/134, 522/166, 170, 181, 114, 120, 121, 129, 116, 522/168, 169, 178, 182; 430/269, 270.1, 430/280.1, 281.1
See application file for complete search history.

(56) References Cited

U.S. PATENT DOCUMENTS

| | | | |
|---|---|---|---|
| 3,809,732 A | 5/1974 | Chandross et al. ........... 264/22 |
| 4,472,020 A | 9/1984 | Evanchuk ............. 350/96.12 |
| 5,442,482 A | 8/1995 | Johnson et al. ............ 359/619 |
| 5,808,108 A * | 9/1998 | Chappelow et al. ........ 549/335 |
| 6,287,745 B1 * | 9/2001 | Yamamura et al. .......... 430/269 |
| 6,306,563 B1 | 10/2001 | Xu et al. .................... 430/321 |
| 6,458,865 B2 * | 10/2002 | Chappelow et al. .......... 522/14 |
| 6,512,874 B2 | 1/2003 | Xu et al. .................... 385/129 |
| 2002/0114601 A1 | 8/2002 | Kagami et al. |
| 2003/0002778 A1 | 1/2003 | Bach et al. .................... 385/16 |
| 2004/0101268 A1 * | 5/2004 | Shih et al. ................... 385/141 |

FOREIGN PATENT DOCUMENTS

| | | |
|---|---|---|
| EP | 09943935 | 9/1999 |
| GB | 2272306 A1 | 5/1994 |
| JP | 2000 347043 A | 12/2000 |
| WO | WO 01/31401 A1 | 5/2001 |
| WO | WO 01/51969 A1 | 7/2001 |
| WO | WO 2005/040052 A | 5/2005 |

OTHER PUBLICATIONS

Byeong-Soo Bae et al., "Photochemical Self-Developing of Doped Sol-Gel Hybrid Glass Waveguides", Organic Photonic Materials and Devices III, Proceedings of SPIE, vol. 4279, pp. 101-108, XP001188955, Jan. 24-25, 2001.

\* cited by examiner

*Primary Examiner*—Sanza L McClendon
(74) *Attorney, Agent, or Firm*—Patrick K. Patnode

(57) ABSTRACT

Disclosed is an optical device structure comprising a low shrinkage mixture wherein the shrinkage of the mixture is limited after the curing of the mixture during optical device formation. Disclosed also are methods for forming optical devices which comprise the low shrinkage mixture.

25 Claims, 4 Drawing Sheets

SELF-FORMING POLYMER WAVEGUIDE AND WAVEGUIDE MATERIAL WITH REDUCED SHRINKAGE

BACKGROUND

The invention relates generally to optical devices such as polymer-based waveguides. More particularly, the invention relates to optical devices exhibiting reduced shrinkage during manufacture, and thus improved light transmission characteristics and device reliability.

Modern high-speed communications systems are increasingly using optical waveguides including fibers for transmitting and receiving high-bandwidth data. The excellent properties of optical waveguides with respect to flexibility and ease of handling and installation are an important driving force for their implementation in high bandwidth, short-haul data transmission applications such as fiber to the home, local area networks, high-speed computing, and automotive information, diagnostic, and entertainment systems, to mention only a few.

In any type of optical communication system there is the need for interconnecting different discrete components. These components may include active devices, such as lasers, detectors, fibers modulators, and switches, for example, and passive devices such as filters and splitters, for example. Polymer-based waveguides offer a viable and potentially inexpensive way of interconnecting these components. Such waveguides should be able to couple light into or out of other optical fibers and components with good efficiency, and deliver optical signals with very low propagation losses. Such losses, in turn are determined primarily by the quality of the polymer, the waveguide structure, and the device boundary.

A proper selection of polymeric materials is necessary for making polymeric optical waveguides that display low attenuation and improved environmental stability without an excessive increase in scattering loss. Moreover, a well-defined introduction of light-confining or light-scattering elements is potentially useful to obtain controlled propagation of light in polymeric optical waveguides.

Waveguide structures can be formed by several techniques. For example, ridge waveguides can be formed by coating a lower clad and core layer onto a substrate, patterning the core by etching or development to form a ridge, and over-coating with an upper clad layer. As another example, embedded or channel waveguides can be formed by coating a lower clad and core material over a substrate, defining the waveguide by UV exposure and depositing an upper clad layer over the formed waveguide. Reactant diffusion occurs between the unexposed core and surrounding clad layers into the exposed core area changing the refractive index (hereinafter also referred to as "RI") of the exposed region to form the waveguide.

During the formation of conventional waveguide structures, severe shrinkage can occur. This can result in movement of the original waveguide away from the end of the optical fiber that formed the waveguide, thus increasing the scatter loss of light traveling through the bulk material due to poor coupling between the fiber tip and the formed waveguide. Techniques proposed to reduce shrinkage problem in the device may require complicated optimization and costly design processes. In certain types of structures and particular applications, the shrinkage problem becomes particularly severe. For example, single-mode optical transmission fibers are often extremely small (much smaller than fibers used for multi-modal transmission). Even relatively modest shrinkage can lead to severe mismatches in alignment of light transmitting pathways between the linked fibers, resulting in unacceptable loss of coupling and consequently poor efficiency.

It would therefore be desirable to have a new waveguide structure to reduce these losses. There is also a need for improved polymer formulation and processing that help reduce the shrinkage of the polymer material structures during processing, thereby facilitating fabrication of reduced loss waveguides. A general need also exists for improved material formulation that can be used for other optical structures, such as planar waveguides, lenses, gratings, and the like.

BRIEF DESCRIPTION

In accordance with one aspect of the invention, a cured composition for an optical device is provided. The cured composition comprises structural units derived from a first photocurable material, a second photocurable material, a first photocuring catalyst, a second photocuring catalyst, and a binder material. The binder material comprises an oligomer having reactive end groups that limit shrinkage of the composition during the curing step.

In accordance with another aspect of the invention, a method for making an optical device is provided. The method comprises curing at least a portion of a low shrinkage mixture comprising a first photocurable material at a first wavelength to at least partially polymerize the first photocurable material and form a partially cured mixture, which includes a first region having a first refractive index. The method further comprises curing at least a portion of the partially cured mixture comprising a second photocurable material at a second wavelength to at least partially polymerize a second photocurable material and form a second region having a second refractive index.

In accordance with yet another aspect of the invention, a method of making optical device is provided. The method comprises curing at least a portion of a low shrinkage mixture comprising a first photocurable material at a first wavelength to at least partially polymerize the first photocurable material and form a partially cured mixture, which includes a first region having a first refractive index. Further, the method comprises curing at least a portion of the partially cured mixture comprising a second photocurable material at a second wavelength to at least partially polymerize a second photocurable material and form a second region having a second refractive index. The method also comprises evaporating uncured first photocurable material, uncured second photocurable material, or combinations thereof.

In accordance with still another aspect of the invention, a method making an optical device is provided. The method comprises disposing two optical waveguides in mutually facing relation at a desired distance apart, the optical waveguides being configured for single-mode optical transmission. Following this, the method comprises disposing between the two optical waveguides a low shrinkage mixture comprising a first photocurable material, a second photocurable material, a binder material, a first photocuring catalyst, and a second photocuring catalyst. Further, the method comprises curing the low shrinkage mixture at a first wavelength to at least partially polymerize the first photocurable material to form a core region having a first refractive index, the core region defining an optical path between the waveguides. Subsequently, the method comprises curing the low shrinkage mixture at a second wavelength to polymerize the second photocurable material to form a boundary region having a second refractive index around the core region, while limiting shrinkage of the mixture via the binder material to maintain alignment of the optical path between the waveguides.

In accordance with another aspect of the invention, a method of making an optical device is provided. The method comprises forming a dimensionally stable film by partially curing a low shrinkage mixture. The low shrinkage mixture includes a binder material, a first photocurable material, a second photocurable material, a first photocuring catalyst active at a first wavelength, and a second photocuring catalyst active at a second wavelength different from the first wavelength. At least a portion of the aforementioned photocurable materials may remain unreacted after the formation of the optical device.

DRAWINGS

These and other features, aspects, and advantages of the present invention will become better understood when the following detailed description is read with reference to the accompanying drawings in which like characters represent like parts throughout the drawings, wherein.

Figure 8:
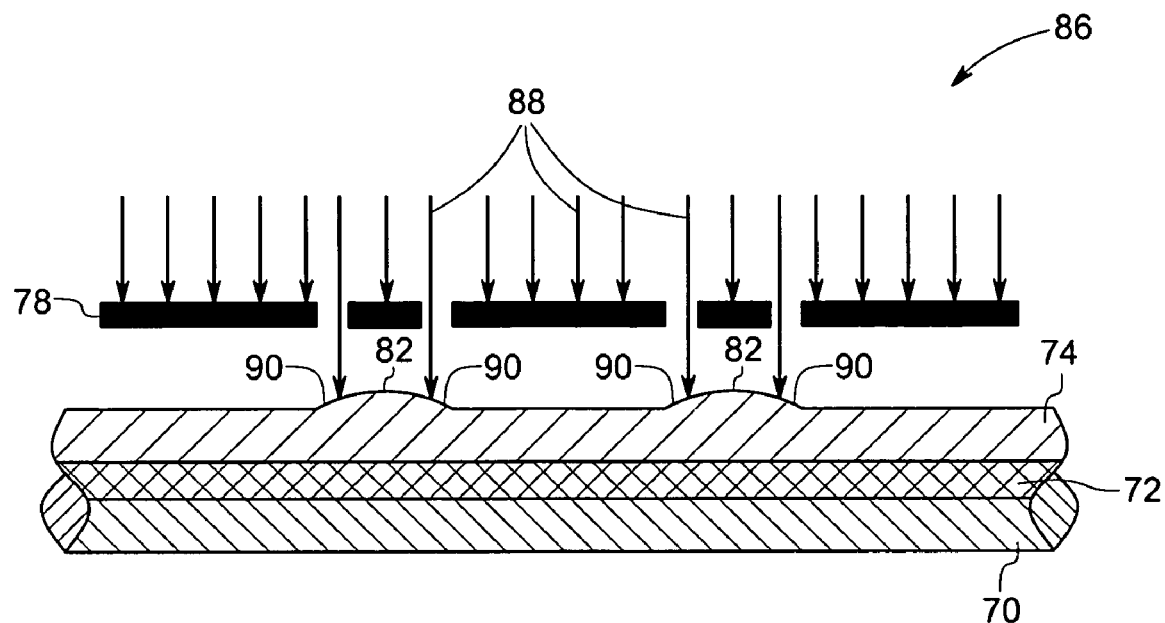
Figure 9:
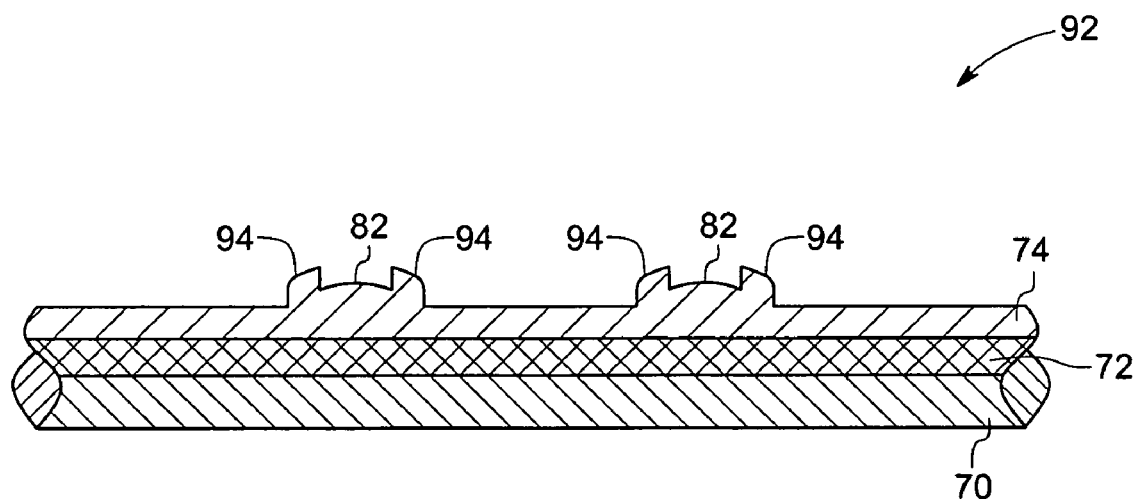

FIG. 8 is a diagrammatical side elevation view of an exemplary planar waveguide during the curing stage of the low shrinkage mixture present on a substrate, with radiation of second wavelength in the presence of an optical mask in accordance with aspects of the present invention; and FIG. 9 is a diagrammatical side elevation view of an exemplary planar waveguide following removal of epoxy monomer from cured regions, and epoxy and acrylic monomers from uncured regions of the low shrinkage mixture in accordance with aspects of the present invention.

DETAILED DESCRIPTION

Figure 1:
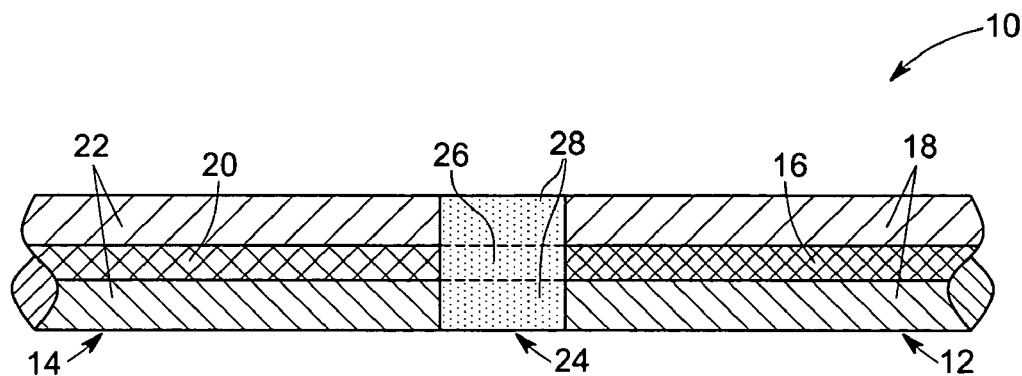
FIG. 1 is a diagrammatical side elevation of an exemplary straight waveguide device with uncured low shrinkage mixture present between optically transparent materials, in accordance with certain aspects of the present invention.

Referring to drawings, FIG. 1 is a diagrammatical side elevation of an exemplary application of the present invention. The application provides for an optical conducting assembly that involves optically linking two optical conductors, such as waveguides used for single mode optical transmission. The application of FIG. 1 may be thought of as a straight waveguide device. The optical conductor assembly, designated by the reference numeral 10, includes a first optical conductor 12 and a second optical conductor 14. The two optical conductors may be disposed at a certain distance apart that may be in the range of from about 50 microns to about 2 millimeters apart. In certain embodiments, one or both of the optical conductors are made of a polymer. Suitable polymers may be thermoplastic, such as a polycarbonate, or the like. In some embodiments, the first and second optical conductors 12 and 14 are made of similar polymeric materials. In some embodiments, the first optical conductor, and the second optical conductor are substantially optically transmissive at the wavelengths for which they are intended, particularly for polymerizing the monomers within the structure as described below.

The first optical conductor includes a core region designated as 16, and a cladding region 18 that surrounds the core region 16. Similarly, the second optical conductor 14 includes a core region 20 and a cladding region 22 that surrounds the core region 20. The core and cladding regions of each conductor differ in refractive indices such that light energy may be efficiently transmitted through the respective core region by reflection from the surrounding cladding region. A joint or splice of the type shown in FIG. 1 may be required between mating optical elements. As discussed below, misalignment between the optical path between the conductors can lead to loss of the optical energy or signal. The present invention may reduce such loss, particularly in self-forming waveguides.

It should also be noted that the relative sizes and dimensions illustrated in FIG. 1 and the following figures are not to scale. That is, a core region of an optical conductor may range, for example, between 3 microns and 10 microns. The surrounding cladding layer is typically much thicker, on the order of 125 microns. The sizes of optical conductors may be dictated, at least in part, by the particular application for the waveguide. For example, in single-mode transmission applications, extremely small waveguides may be used, having core regions on the order of 3 microns in diameter. For extremely small waveguides, problems of misalignment that can lead to signal loss in such applications are particularly acute, and are addressed by the low shrinkage materials and processing described below.

A low shrinkage mixture composition 24 that may be used as a self-forming optical waveguide disposed in between the two optical conductors 12 and 14 is also shown in FIG. 1. The low shrinkage mixture composition 24 may include two regions 26 and 28, wherein region 26 is aligned with the core regions 16 and 20 of the optical conductors, while region 28 is aligned with the cladding regions 18 and 22 of the optical conductors. The low shrinkage mixture may include at least one curable monomer such as an acrylic monomer, a sulphone monomer, a cyanate monomer, an epoxy monomer, a vinyl monomer, or combinations thereof. In one embodiment, the low shrinkage mixture includes two curable monomers. The low shrinkage mixture also includes a binder material that may serve to limit shrinkage as described below.

Figure 2:
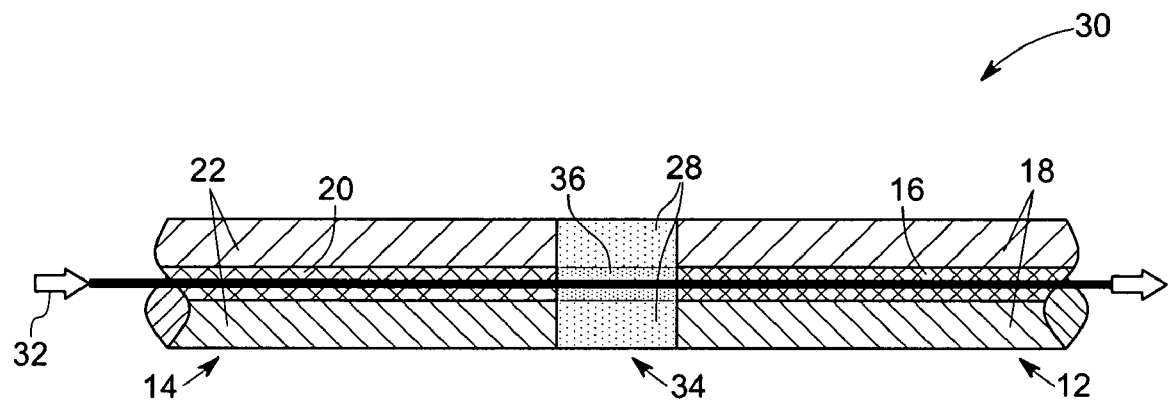
FIG. 2 is a side elevation of the arrangement shown in FIG. 1 with the low shrinkage mixture in the core region selectively cured and the path of light through the core region.

FIG. 2 shows an optical conductor assembly 30, which is a diagrammatical side elevation of the same arrangement shown in FIG. 1. In the illustration of FIG. 2, the core region 16 of the first optical conductor 12, the core region 20 of the second optical conductor 14, and the core region 26 in the low shrinkage mixture 24 are exposed to radiation of a first wavelength, designated generally by reference numeral 32 in FIG. 2. The exposed regions of the core of the low shrinkage mixture may result in at least partially curing to form a region of first refractive index 36. The extent of curing, and thus the refractive index of the region may be controlled by the time of exposure to the radiation and the wavelength of the radiation.

Figure 3:
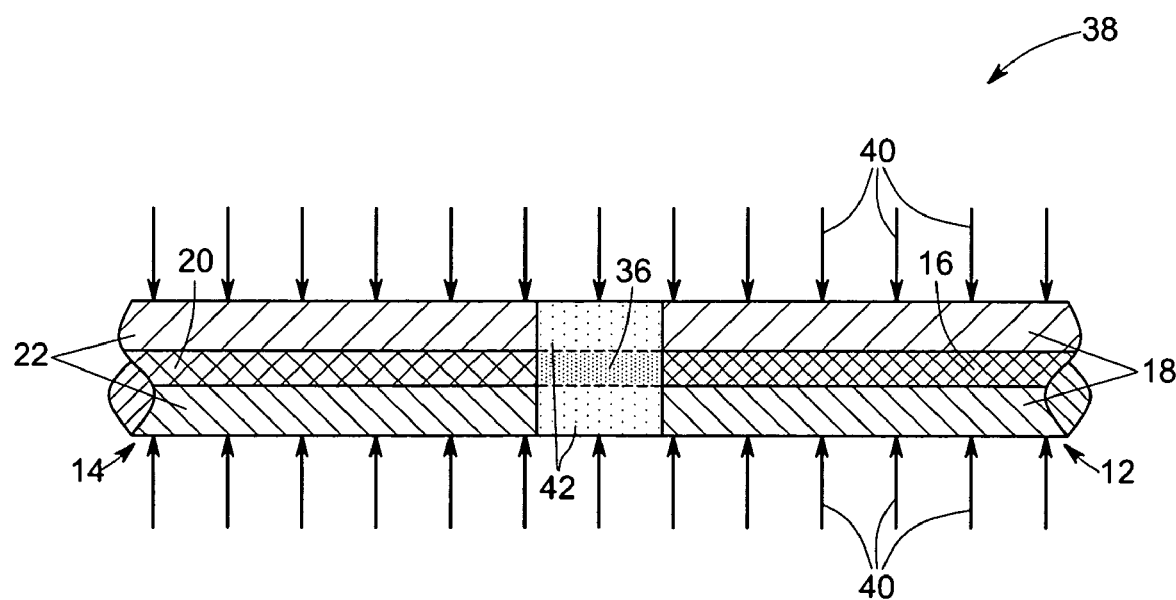
FIG. 3 is a side elevation of the arrangement of the preceding figures, wherein the core and cladding regions are cured with blanket UV radiation.

FIG. 3 shows an optical conductor assembly 38, which is a diagrammatical side elevation of the same arrangement shown in FIG. 2, wherein the entire assembly is exposed to radiation of a second wavelength 40. This may result in at least partial curing of the cladding region 28 shown in FIG. 2 to form a region of second refractive index 42. Thus, two regions 36 and 42 having two different refractive indices may be formed in the mixture, so as to establish a continuous optical path between the conductors. The extent of curing, and thus the refractive index of the region may be controlled by the time of exposure to the radiation and the second wavelength of the radiation.

Figure 4:
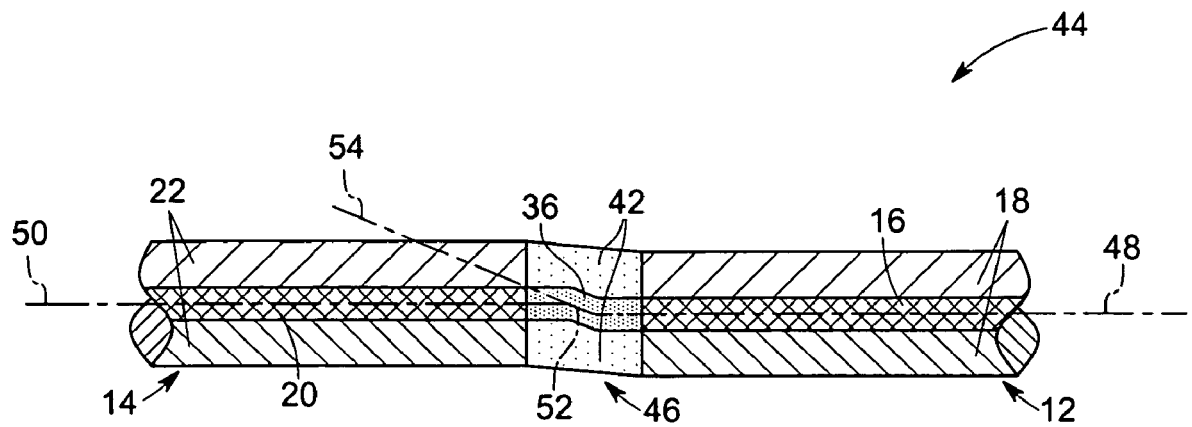
FIG. 4 is a side elevation of the same arrangement, wherein the path of the light radiation through the waveguide device is directed through the bent portion of the core with very little loss.

FIG. 4 illustrates an optical conductor assembly 44, which is a diagrammatical side elevation of an optical conductor assembly resulting from the processing described above. The axis of the first optical conductor 12 is designated by the reference numeral 48. Similarly, the axis of the second optical conductor 14 is designated by the reference numeral 50. The axis of the cured core region 36 of the self-formed waveguide 46 is designated by the numeral 52 here. FIG. 4 illustrates the angular misalignment between the axes of the optical conductors 50 and the self-formed waveguide 52. Ideally, the angle of misalignment should be zero to limit optical losses during transmission through the core region. But it is appreciated by those skilled in the art that practically achieving zero misalignment is very difficult. The angle of misalignment can be a maximum of about 5 degrees so that the self-forming waveguide can transmit the radiation with very minimal loss. In one embodiment of the present invention, the angle of misalignment for a self-forming waveguide is less than 2 degrees.

Figure 5:
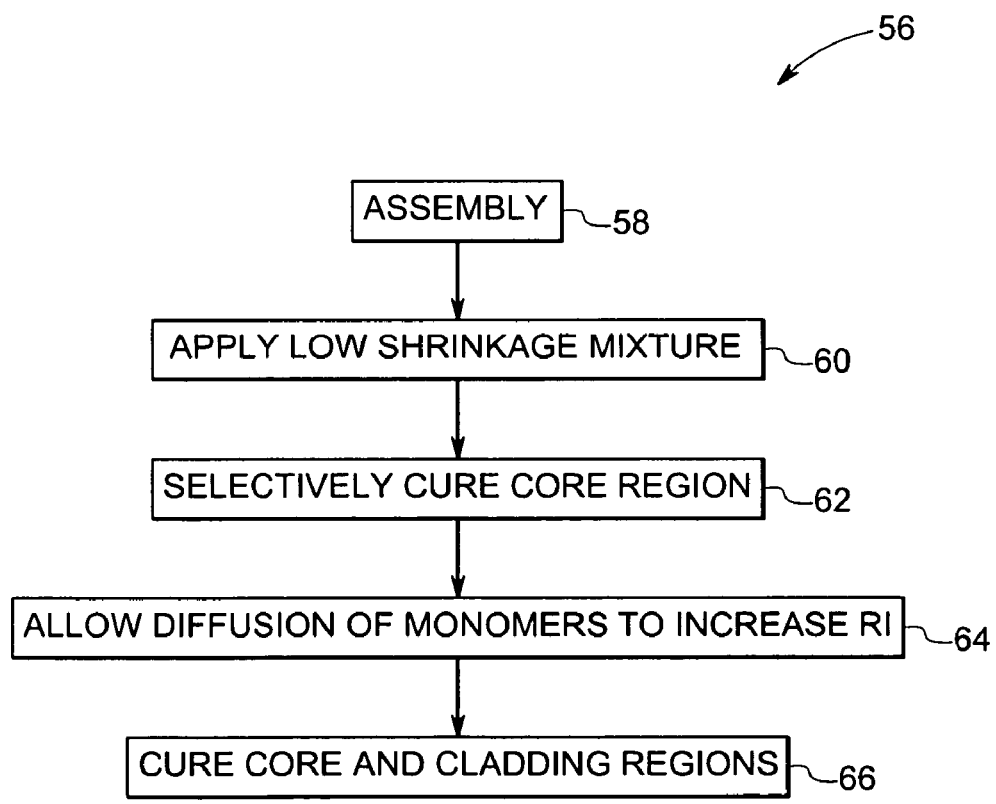
FIG. 5 is a flow chart representing exemplary steps for the preparation of a waveguide in accordance with aspects of the present invention.

Referring to FIG. 5, a method for making an optical conductor assembly is illustrated and generally designated by reference numeral 56. Initially, two optical conductors 12 and 14 that each includes a core region 16 and 20 and a cladding region 18 and 22, as shown in FIG. 1, may be disposed in a mutually facing relation, as represented by block 58. Next, a low shrinkage mixture 24 may be disposed between the pair of optical waveguides (see FIG. 1), as represented by block 60. The core region of the optical conductors and the low shrinkage mixture may be selectively cured (see FIG. 2) by introducing a radiation of a first wavelength 32 through one or both the core regions of the optical conductors to form a region of first refractive index 36. Any diffusion of monomers between the cured and uncured regions may be allowed to occur so that refractive index differentiation may be enhanced by this process, as represented by block 64. Then, the core and the cladding regions may be cured using a radiation of a second wavelength 40 (see FIG. 3) to form region of second refractive index, as represented by block 66. The components of the composition and the curing conditions to form the desired optical device are discussed in greater detail below.

Figure 6:
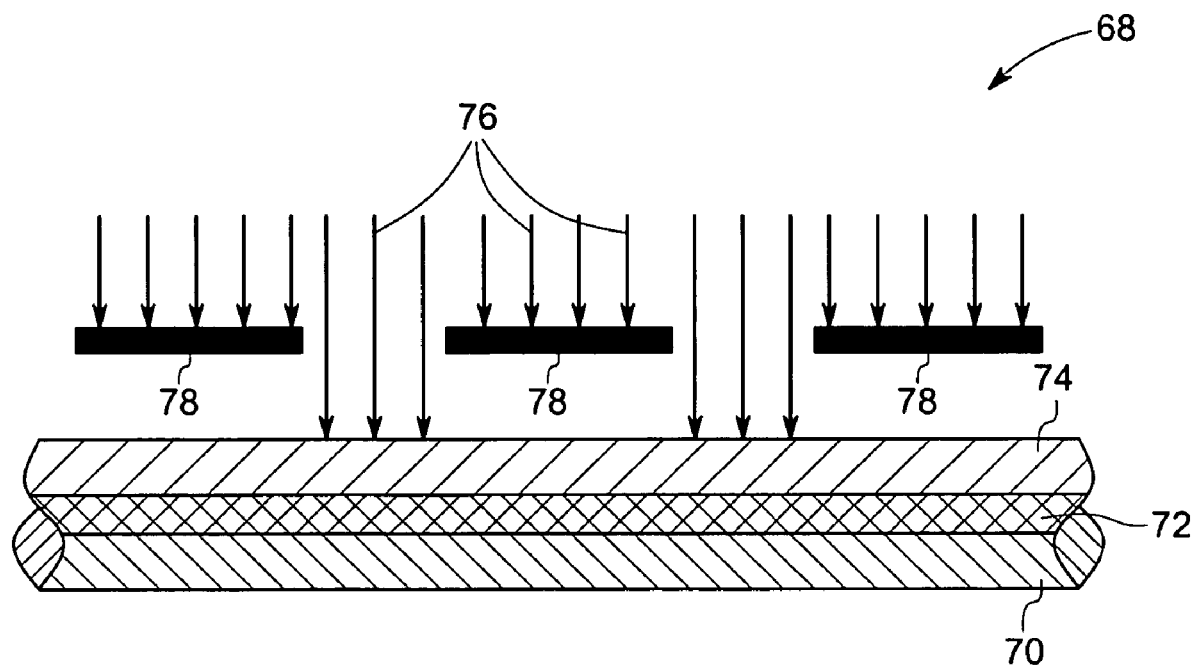
FIG. 6 is a diagrammatical side elevation view of an exemplary planar waveguide during the curing stage of the low shrinkage mixture that is disposed on a substrate, with radiation of a first wavelength in the presence of an optical mask in accordance with aspects of the present invention.

The foregoing general technique may be used to form a variety of optical structures and waveguides other than that shown in FIGS. 1-4. For example FIGS. 6-9 illustrate one embodiment of the present invention, which is a method to form surface gratings. FIG. 6 is a diagrammatic side view illustrating an exposure step in accordance with one embodiment of the present invention. Optical assembly referenced by numeral 68, includes a substrate 70 that may be formed from any structurally suitable material. The substrate material may, for example, include a glass, quartz, plastic, a ceramic, a crystalline material, or a semiconductor material, such as, but not limited to, silicon, silicon oxide, gallium arsenide, and silicon nitride, or combinations thereof. The assembly 68 may further include at least one cladding layer 72. The cladding layer may be made of a polymer, such as a thermoplastic, a polycarbonate, or the like. In some embodiments, the cladding layer is substantially optically transmissive at the wavelengths for which they are intended. The assembly 68 also may include a low shrinkage mixture 74. The low shrinkage mixture may include at least one curable monomer such as an acrylic monomer, a cyanate monomer, an epoxy monomer, a vinyl monomer, or combinations thereof. In one embodiment, the low shrinkage mixture includes two curable monomers. The low shrinkage mixture also includes a binder material. The low shrinkage mixture may be cured by exposure to radiation of first wavelength 76. Patterning may be accomplished by the use of a mask 78 such as a gray scale mask for example. Other alternative forms of irradiation such as a direct-write laser can also be used.

Figure 7:
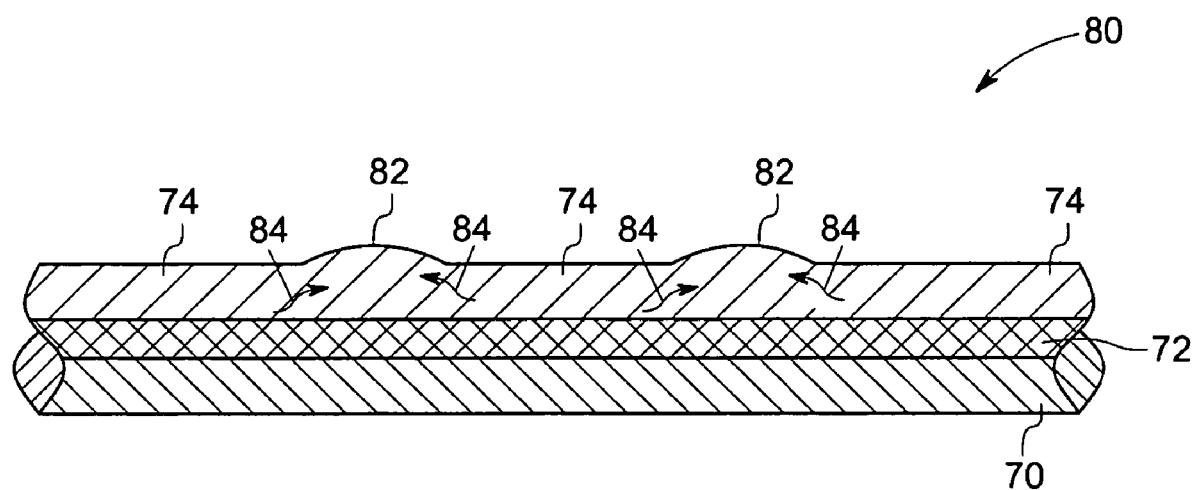
FIG. 7 is a diagrammatical side elevation view of an exemplary planar waveguide with the cured and uncured regions of the low shrinkage mixture followed by diffusion of monomers from the uncured regions to the cured regions in accordance with aspects of the present invention.

FIG. 7 is a diagrammatic side view of optical assembly 80 illustrating the effect of curing the assembly 68 shown in FIG. 6. The low shrinkage mixture may include unexposed regions, depicted as 74 having uncured monomers, and exposed regions that are depicted as 82 that have cured monomers. Further, some of the monomers may diffuse from the unexposed regions 74 to the exposed regions 82, which is represented as 84.

FIG. 8 is a diagrammatic side view illustrating the optical assembly 86 that is further cured with radiation of a second wavelength 88. Patterning may be accomplished by the use of a mask 78, such as a gray scale mask for example. The low shrinkage mixture layers that are exposed to the radiation of the second wavelength are depicted by reference numeral 90.

FIG. 9 is a diagrammatic side view of optical assembly 92 illustrating the effect of curing the assembly 86 with radiation of the second wavelength. The low shrinkage mixture layers that are exposed to the radiation of second wavelength to form regions of second refractive index is depicted by reference numeral 94. This assembly may further optionally be subjected to a baking step (also referred to as evaporating or volatilizing). The thicknesses of the regions 74, 82 and 94 may be independently and accurately controlled in this manner.

In certain presently contemplated embodiments, the binder material comprises any oligomer that is compatible with the monomer chosen. Oligomers are polymers with lower molecular weights in the range of from about 500 grams/mole to about 10,000 grams/mole. Binder material is typically derived from one of an acrylate oligomer, a polyimide oligomer, a polycarbonate oligomer, a polysulfone oligomer, a polyether ketone oligomer, a polyester oligomer, and combinations thereof. The binder typically comprises oligomers having reactive end groups. Typical reactive end groups include alcohols, amines, isocyanates, olefinic groups, epoxy groups, and the like. The binder material has a molecular weight in the range of from about 500 grams/mole to about 10,000 grams/mole, more preferably in the range of from about 500 grams/mole to about 5,000 grams/mole.

The composition, as described and used herein, comprises at least two different photocurable monomers. The first photocurable monomer may comprise, for example, a vinyl compound. Exemplary vinyl compounds include, but are not limited to, vinyl ether, an alkenyl ether, an allene ether, a ketene acetal, an acrylate, a diacrylate or polyacrylate, a methacrylate, a methyl methacrylate, an acrylamide, a methacrylamide, a styrene, a substituted styrene, a vinyl naphthalene, a substituted vinyl naphthalene, a vinyl derivative, a maleate, a thiol, an olefin, or combinations comprising at least one or more of the foregoing vinyl compounds.

The second photocurable compound may comprise, for example, an epoxy compound. Exemplary epoxy compounds include, but are not limited to, cyclohexene oxide, cyclopentene oxide, 4-vinyl cyclohexene oxide, a 4-alkoxymethylcyclohexene oxide, a acyloxymethylcyclohexene oxide, 3,4-epoxycyclohexylmethyl-3,4-epoxycyclohexanecarboxylate, bis-(3,4-epoxycyclohexylmethyl)adipate, 1,3-bis(2-(3,4-epoxycyclohexyl)ethyl)-1,1,3,3-tetramethydisiloxane, 2-epoxy-1,2,3,4-tetrahydronaphthalene; a derivative capable of being prepared from any of the foregoing epoxides; or combinations comprising one or more of the foregoing epoxy compounds.

In addition to the at least one polymer binder and at least two uncured monomers, the polymerizable composite material may further include at least one of a photocuring catalyst or a photo-initiator, a co-catalyst, an anti-oxidant, additives such as, but not limited to, chain transfer agents, photo-stabilizers, volume expanders, free radical scavengers, contrast enhancers, nitrones, flexiblizers and UV absorbers. The relative amounts of the components of the mixture may be determined based upon the particular materials selected, as well as the application (e.g., the optical structures sought, their dimensions and the wavelength and transmission mode). In one embodiment, the monomer comprises from about 5% to about 80% by weight of the polymerizable composite.

Non-limiting examples of photocuring catalysts that can be used for polymerizing a radiation-polymerizable monomer include diazonium, sulfonium, phosphonium and iodonium salts. Exemplary photocuring catalysts include triarylsulfonium hexafluoroantimonate salt and triarylsulfonium hexafluorophosphate salt (also referred to hereinafter as "CYRACURE®" commercially available from Dow Chemicals, Midland, Mich., USA), diaryliodonium hexafluoroantimonate (also referred to hereinafter as UV9392C® commercially available from General Electric Silicones in Waterford, N.Y., USA), 1-hydroxy-cyclohexyl-phenyl-ketone, 2,2-dimethoxy-1,2-diphenylethan-1-one or 2-methyl-1[4-(methylthio)phenyl]-2-morpholinopropan-1-one (also referred to hereinafter as "IRGACURE®" commercially available from Ciba Specialty Chemicals, Tarrytown, N.Y., USA). In such embodiments, the photocuring catalyst present in each polymerizable composite is present in an amount sufficient to polymerize the uncured monomer upon exposure to radiation. In a typical embodiment, two different photocuring catalysts are used wherein each photocuring catalyst has a different activating wavelength of radiation.

When the radiation curable compounds described above are cured by ultraviolet radiation, the curing time may be reduced by adding a photo-sensitizer, such as, but not limited to, benzoin, benzoin methyl ether, benzoin ethyl ether, benzoin isopropyl ether, benzil(dibenzoyl), diphenyl disulfide, tetramethyl thiuram monosulfide, diacetyl, azobisisobutyronitrile, 2-methyl-anthraquinone, 2-ethyl-anthraquinone or 2-tert-butylanthraquinone, to the low shrinkage mixture.

The mixture as described herein can be applied without the use of any external solvent or may be added as a solution in a solvent followed by evaporation of the solvent. When the mixture is applied onto a cladding substrate, the use of optional adhesives is also within the scope of the invention. Optional additives may also be added to the formulation before or after the curing step, wherever appropriate. Illustrative examples of optional additives comprise absorptive materials, polarizers, expansion agents, surfactants, emulsifiers, thermal stabilizers, defoamers, adhesion promoters, and like materials. In another embodiment, the low shrinkage mixture comprises both the core and the cladding regions.

The composition is formulated such that the final formulation is fully compatible. Formulations are considered to be compatible if a blend of the components is characterized, in a 90° light scattering experiment using a wavelength used for device formation, by a Rayleigh ratio ($R_{90°}$) less than about $7 \times 10^{-3}$ cm$^{-1}$. The Rayleigh ratio is a well-known property, and is defined as the energy scattered by a unit volume in the direction $\theta$ (per steradian), when a medium is illuminated with a unit intensity of unpolarized light. The Rayleigh ratio may be obtained by comparison to the energy scatter of a reference material having a known Rayleigh ratio. The compatibility of the binder material with other components, such as the photoactive material, may be increased by appending to the binder material groups that resemble such other components (e.g., a functional group from a photoactive material), or by appending to the binder material a group that displays a favorable enthalpic interaction, such as hydrogen bonding, with such other components. Modifications may be made to various components of a material to increase the overall compatibility of the individual components.

The composition, as described herein, is typically exposed to a radiation of a first wavelength at which the first photocuring catalyst is active. The wavelength of the radiation of the first wavelength may be in a range from about 1000 angstroms to about 7000 angstroms. The lamp systems used to generate such radiation include, for example, xenon, metallic halide, metallic arc, low or high pressure mercury vapor discharge lamp, laser source, and the like. The curing period may be in a range from about 1 millisecond to about 30 minutes. This in turn, initiates the polymerization of the first photocurable monomer. The polymerization of the first photocurable monomer causes a region of first refractive index. During the polymerization of the first photocurable monomer, diffusion of the first photocurable monomer from the unexposed regions to the exposed regions occurs. The first photocurable monomer, while polymerizing, may react with the reactive end groups of the binder, thus becoming chemically bound to the binder.

Subsequently, the partially cured mixture is exposed to a radiation of a second wavelength at which the second photocuring catalyst is active. The wavelength of the radiation of the second wavelength is different from the wavelength of the radiation of the first wavelength and may be in a range from about 1000 angstroms to about 7000 angstroms. The lamp systems used to generate such radiation include, for example, xenon, metallic halide, metallic arc, low or high pressure mercury vapor discharge lamp, laser source, and the like. The curing period may be in a range from about 1 millisecond to about 30 minutes. This polymerizes the second photocurable monomer. In one embodiment, a portion of the second photocurable monomer is polymerized. In another embodiment, the second photocurable monomer is polymerized completely. In a further embodiment, the first curable monomer is polymerized during the polymerization of the second photocurable monomer that is initiated by the second photocuring catalyst due to exposure of the mixture to a radiation of a second wavelength at which the second photocuring catalyst is active. Polymerization of the second photocurable monomer causes regions of second refractive index.

In some embodiments, the refractive index of the different regions may be individually tailored by the appropriate choice of the first photocurable monomers and the second photocurable monomers. When one or more first photocurable monomers are used, the final refractive Index (RI) of the region of first refractive index (hereinafter designated as "$RI_1$") depends on the quantity of the individual polymer components (which would be given by the quantity of the individual monomers present in the first photocurable monomer) making up the region of first refractive index and their respective refractive indices. The final refractive index of the region of first refractive index may be given by Equation (1):

$$RI_1 = \Sigma(W_n \times RI_n) \quad \text{(Eq. 1)}$$

where "$W_n$" represents the weight percent of the $n^{th}$ polymer component in the region of first refractive index, and "$RI_n$" represents the RI of the $n^{th}$ polymer component in the region of first refractive index. Similarly, the refractive index of the region of second refractive index (hereinafter designated as "$RI_2$") may be tuned by the appropriate choice of one or more second photocurable monomer. The final refractive index of the region of first refractive index may be given by Equation (1):

$$RI_2 = \Sigma(W_n \times RI_n) \quad \text{(Eq. 1)}$$

where "$W_n$" represents the weight percent of the $n^{th}$ polymer component in the region of second refractive index, and "$RI_n$" represents the RI of the $n^{th}$ polymer component in the region of second refractive index. The refractive index may also be dependent on the thickness of the polymerizable composite. In one embodiment, the first photocurable monomers and the second photocurable monomers are chosen such that the difference in the refractive index between the regions of first refractive index and regions of second refractive index is at least about 0.005. The difference in refractive index can be further tuned by varying the time of exposure to radiation, intensity of the radiation, wavelength of the radiation, temperature, and so on. Such variations in the conditions to control the polymerization thereby tuning the refractive index difference between the two regions will become apparent to those skilled in the art.

In a further embodiment, any unreacted monomer remaining after the curing reactions in the low shrinkage mixture may be removed by techniques known to those skilled in the art. These techniques include heating the mixture to a temperature greater than the boiling point of the first photocurable material and the second photocurable material for a suitable period of time.

In another embodiment, selective removal of unreacted monomers may be effected. This may be effected by exposing the cured composition to a radiation of the first wavelength, thereby causing the uncured first photocurable monomer to be polymerized. Alternately, the cured composition may be exposed to a radiation of the second wavelength, thereby causing the uncured second photocurable monomer to be polymerized. In yet another aspect, the cured composition may be exposed to radiations of first wavelength and second wavelength. Subsequently, the first unreacted monomer, the second unreacted monomer, or combinations thereof may be removed by an evaporation step. In yet another aspect, latent thermal catalysts may be included in the composition to facilitate the evaporation of any uncured photocurable monomer during the evaporation step while simultaneously causing the other uncured photocurable monomer to be polymerized.

In one embodiment where the low shrinkage mixture comprises both the core and cladding regions, the photocuring is performed by exposing the mixture to a pointed write laser of a first wavelength. During this step, the first photocurable monomer from the unexposed regions diffuse into the exposed regions and further polymerize to form a region of a first refractive index. This first step defines the core region which also defines the path of the light passing through. In a second step, the mixture is exposed to a second wavelength thereby curing a portion of the second photocurable monomer or fully curing the second photocurable monomer.

In a further embodiment, the low shrinkage mixture is partially cured to form a dimensionally stable film. A "dimensionally stable film" refers to a film that is dimensionally self-supporting and retains the shape of the film when picked up at one edge and held in space for a period of time in the absence of any supports such as spacer plates or substrates. This dimensionally stable film formed from the low shrinkage mixture comprises at least a portion of the photocurable materials unreacted. The formed film is then subjected to the curing steps as described to form an optical device.

The materials and method used herein to form the optical device results in very low shrinkage in going from the uncured state of the monomers to the at least partially cured state to form the device. The extent of shrinkage is typically less than about 5%, more typically, less than about 1% and most typically, less than about 0.5%.

The optical device prepared by the method described find uses in many applications such as self-forming waveguides, planar waveguides, Fresnel lenses, gratings, micro optical lenses, data array chips, and chips interconnection.

EXAMPLES

Hexahydro-4-methylphthallic anhydride and 1,4-cyclohexanedimethanol were obtained from Aldrich Chemical Co., Milwaukee, Wis. ERL4221®, ERL4299®, and CYRACURE UVI-6992® were obtained from Dow Chemical Co., Midland, Mich. KFLEX188® and KPURE CXC-1612® were obtained from King Industries, CT. EBECRYL3700® was obtained from Surface Specialties UCB, Smyrna, Ga. SILWET7604® was obtained from General Electric Silicones, Tarrytown, N.Y. IRGACURE 819® and IRGACURE 184® were obtained from Ciba Specialty Chemicals, Tarrytown, N.Y. CN2252® and SR-101® were obtained from Sartomer Co., Exton, Pa. A hydroxy terminated cycloaliphatic polyester oligomer was prepared by reacting 8.3 grams hexahydro-4-methylphthallic anhydride with 8.6 grams 1,4-cyclohexanedimethanol at a temperature of about 200° C. until about 0.9 grams of water was collected from the condensation polymerization. The final oligomeric product was found to have a weight average molecular weight of about 1600 grams/mole.

Example 1

The following materials were blended together with mixing, followed by filtration through a 0.5 microns nominal sized filter and degassed:

10 grams ERL4221®;
20 grams ERL4299®;
3.5 grams KFLEX® 188;
15 grams EBECRYL3700®;
0.15 grams SILWET7604®;
0.8 grams CYRACURE UVI-6992®;
0.05 grams IRGACURE 819®;
0.08 grams IRGACURE 184®.

Subsequently, the mixture was exposed to radiation between 400 nanometers to 450 nanometers. Subsequently, the mixture was further exposed to a radiation from 365 nanometers. The measurement of shrinkage after curing a sample as described above indicated less than 1% shrinkage.

Example 2

The following materials were blended together with mixing, followed by filtration through a 0.5 microns nominal sized filter and degassed:
10 grams ERL4221®;
20 grams ERL4299®;
15 grams SR-101®;
0.15 grams SILWET7604®;
0.8 grams CYRACURE UVI-6992®;
0.05 grams IRGACURE 819®;
0.08 grams IRGACURE 184®.
0.5 gr CXC-1612

The mixture was coated onto a silicon wafer substrate to form a homogeneous, thin film of about 25 microns thick. A portion of the film was exposed to a first radiation having a wavelength in the range of from about 400 nanometers to about 450 nanometers. Subsequently, the already exposed portion of the film was exposed to a second radiation having a wavelength of 365 nanometers. The film was then baked ramped form 80° C. to 190° C. over an hour and held for 30 minutes at that temperature, then cooled voer 30 minutes back to 80° C. Refractive Index analysis showed that the regions exposed to radiations of first and second wavelength had an RI of 1.512 while the regions that were unexposed has an RI of 1.503.

Example 3

The following materials were blended together with mixing, followed by filtration through a 0.5 u nominal sized filter and degassed:
12 grams ERL4221®;
12 grams ERL4299®;
16 grams of hydroxy terminated cycloaliphatic polyester;
16 grams CN2252®;
0.1 grams SILWET7604®;
1.0 grams CYRACURE UVI-6992®;
0.12 grams IRGACURE 819®;
0.19 grams IRGACURE 184®.

Measurement of shrinkage for the mixture after the curing steps indicated less than 0.5% shrinkage.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A composition comprising structural units derived from a first photocurable material, a second photocurable material, a binder material, a first photocuring catalyst, and a second photocuring catalyst; the binder material comprising an oligomer having ester repeat units and comprising hydroxyl end groups; and wherein the binder material is a hydroxy-terminated poly(butylene-1,4-cyclohexane dicarboxylate), a hydroxy-terminated poly(cyclohexane dimethyl hexahydro-4-methylphthalate), or combinations thereof.

2. The composition of claim 1, the first photocurable material comprising a vinyl compound.

3. The composition of claim 2, the first photocurable material material comprising a vinyl ether, an alkenyl ether, an allene ether, a ketene acetal, an acrylate, a diacrylate, a polyacrylate, a methacrylate, a methyl methacrylate, an acrylamide, a methacrylamide, a styrene, a substituted styrene, a vinyl naphthalene, a substituted vinyl naphthalene, a maleate, a thiol, an olefin, or combinations comprising at least two of the foregoing vinyl compounds.

4. The composition of claim 1, the second photocurable material comprising an epoxy compound.

5. The composition of claim 4, the second photocurable material comprising cyclohexene oxide, cyclopentene oxide, 4-vinyl cyclohexene oxide, a 4-alkoxymethylcyclohexene oxide, a acyloxymethylcyclohexene oxide, 3,4-epoxycyclohexylmethyl-3,4-epoxycyclohexa necarboxylate, bis-(3,4-epoxycyclohexylmethyl)adipate, 1,3-bis(2-(3,4-epoxycyclohexyl)ethyl)-1,1,3,3-tetramethydisiloxane, 2-epoxy-1,2,3,4-tetrahydronaphthalene; a derivative capable of being prepared from any of the foregoing epoxides; or combinations comprising two of the foregoing epoxides.

6. A method of making an optical device, comprising:
curing at least a portion of a low shrinkage mixture comprising a first photocurable material at a first wavelength to at least partially polymerize the first photocurable material and to form an at least partially cured mixture, which includes a first region having a first refractive index;
curing at least a portion of the partially cured mixture comprising a second photocurable material at a second wavelength to at least partially polymerize a second photocurable material and form a second region having a second refractive index;
the low shrinkage mixture comprising a first photocurable material, a second photocurable material, a binder material, a first photocuring catalyst, and a second photocuring catalyst, the binder material limiting shrinkage of the mixture during curing operations;
the binder material comprising an oligomer having ester repeat units and comprising hydroxyl end arouos: and wherein the binder material is a hydroxy-terminated poly(butylene-1,4-cyclohexane dicarboxylate), a hydroxy-terminated poly(cyclohexane dimethyl hexahydro-4-methylphthalate), or combinations thereof.

7. The method of claim 6, the first photocurable material comprising a vinyl compound.

8. The method of claim 7, the first photocurable material comprising a vinyl ether, an alkenyl ether, an allene ether, a ketene acetal, an acrylate, a diacrylate, a polyacrylate, a methacrylate, a methyl methacrylate, an acrylamide, a methacrylamide, a styrene, a substituted styrene, a vinyl naphthalene, a substituted vinyl naphthalene, a vinyl derivative, a maleate, a thiol, an olefin, or combinations comprising at least two of the foregoing vinyl compounds.

9. The method of claim 6, the second photocurable material comprising an epoxy compound.

10. The method of claim 9, the second photocurable material comprising cyclohexene oxide, cyclopentene oxide, 4-vinyl cyclohexene oxide, a 4-alkoxymethylcyclohexene oxide, a acyloxymethylcyclohexene oxide, 3,4-epoxycyclohexylmethyl-3,4-epoxycyclohexanecarboxylate, bis-(3,4-epoxycyclohexylmethyl)adipate, 1,3-bis(2-(3,4-epoxycyclohexyl)ethyl)-1,1,3,3-tetramethydisiloxane, 2-epoxy-1,2,3,4-tetrahydronaphthalene; a derivative capable of being prepared from any of the foregoing epoxides; or combinations comprising two of the foregoing epoxides.

11. The method of claim 6 further comprising evaporating uncured first photocurable material, uncured second photocurable material, and combinations thereof.

12. The method of claim 6 further comprising exposing of cured composition to radiation of first wavelength, radiation of second wavelength, or combinations thereof.

13. The method of claim 6, wherein the difference between the first refractive index and the second refractive index is at least 0.005.

14. The method of claim 6, wherein the optical device comprises a single mode waveguide.

15. The method of claim 6, wherein the optical device comprises a microlens.

16. An optical device made by the method of claim 6.

17. A method of making an optical device, comprising:
curing at least a portion of a low shrinkage mixture comprising a first photocurable material at a first wavelength to at least partially polymerize the first photocurable material and form a partially cured mixture, which includes a first region having a first refractive index;
curing at least a portion of the partially cured mixture comprising a second photocurable material at a second wavelength to at least partially polymerize a second photocurable material and form a second region having a second refractive index;
evaporating uncured first photocurable material, uncured second photocurable material, or combinations thereof;
the low shrinkage mixture comprising a first photocurable material, a second photocurable material, a binder material, a first photocuring catalyst, and a second photocuring catalyst, the binder material limiting shrinkage of the mixture during curing operations;
the binder material comprising an oligomer having ester repeat units and comprising hydroxyl end groups: and wherein the binder material is a hydroxy-terminated poly(butylene-1,4-cyclohexane dicarboxylate), a hydroxy-terminated poly(cyclohexane dimethyl hexahydro-4-methylphthalate), or combinations thereof.

18. A method of making an optical device comprising:
disposing two optical waveguides in mutually facing relation at a desired distance apart, the optical waveguides being configured for single-mode optical transmission;
disposing between the two optical waveguides a low shrinkage mixture comprising a first, photocurable material, a second photocurable material, a binder material, a first photocuring catalyst, and a second photocuring catalyst;
curing the low shrinkage mixture at a first wavelength to at least partially polymerize the first photocurable material to form a core region having a first refractive index, the core region defining an optical path between the waveguides; and
curing the low shrinkage mixture at a second wavelength to polymerize the second photocurable material to form a boundary region having a second refractive index around the core region, while limiting shrinkage of the mixture via the binder material to maintain alignment of the optical path between the waveguides; wherein the binder material is a hydroxy-terminated poly(butylene-1,4-cyclohexane dicarboxylate), a hydroxy-term mated poly(cyclohexane dimethyl hexahydro-4-methylphthalate), or combinations thereof.

19. The method of claim 18, wherein radiation of first wavelength is applied to the mixture via at least one of the waveguides to form the core region.

20. The method of claim 18, wherein one or both optical waveguides are optical fibers.

21. The method of claim 18, wherein one or more optical waveguides are planar waveguides.

22. A method of making an optical device comprising:
forming a dimensionally stable film by partially curing a low shrinkage mixture which includes a binder material, a first photocurable material, a second photocurable material, a first photocuring catalyst active at a first wavelength, and a second photocuring catalyst active at a second wavelength different from the first wavelength;
the binder material comprising an oligomer having ester repeat units and comprising hydroxyl end groups: and wherein the binder material is a hydroxy-terminated poly(butylene-1,4-cyclohexane dicarboxylate), a hydroxy-terminated poly(cyclohexane dimethyl hexahydro-4-methylphthalate), or combinations thereof; and
wherein at least a portion of the photocurable materials remain unreacted after the formation of the optical device.

23. A method of making an optical device, comprising:
disposing two optical waveguides in mutually facing relation at a desired distance apart, the optical waveguides being configured for single-mode optical transmission;
disposing between the two optical waveguides a low shrinkage mixture comprising a first photocurable material, a second photocurable material, a binder material, a first photocuring catalyst, and a second photocuring catalyst;
curing at least a portion of a low shrinkage mixture comprising a first photocurable material at a first wavelength to at least partially polymerize the first photocurable material and to form an at least partially cured mixture, to form a core region having a first refractive index which includes a first region having a first refractive index; the core region defining an optical path between the waveguides; and
curing at least a portion of the partially cured mixture comprising a second photocurable material at a second wavelength to at least partially polymerize a second photocurable material to form a boundary region having a second refractive index around the core region, while limiting shrinkage of the mixture via a binder material to maintain alignment of the optical path between the waveguides; wherein the binder material is a hydroxy-terminated poly(butylene-1,4-cyclohexane dicarboxylate), a hydroxy-terminated poly(cyclohexane dimethyl hexahydro-4-methylphthalate), or combinations thereof.

24. A method of making an optical device, comprising:
disposing two optical waveguides in mutually facing relation at a desired distance apart, the optical waveguides being configured for single-mode optical transmission;
disposing between the two optical waveguides a low shrinkage mixture comprising a first photocurable material, a second photocurable material, a binder material, a first photocuring catalyst, and a second photocuring catalyst;
curing at least a portion of a low shrinkage mixture comprising a first photocurable material at a first wavelength to at least partially polymerize the first photocurable material and form a partially cured mixture, to form a core region having a first refractive index, the core region defining an optical path between the waveguides;
curing at least a portion of the partially cured mixture comprising a second photocurable material at a second wavelength to at least partially polymerize a second photocurable material to form a boundary region having a second refractive index around the core region, while limiting shrinkage of the mixture via the binder material to maintain alignment of the optical path between the waveguides; wherein the binder material is a hydroxy-terminated poly(butylene-1,4-cyclohexane dicarboxylate), a hydroxy-terminated poly(cyclohexane dimethyl hexahydro-4-methylohthalate), or combinations thereof; and evaporating uncured first photocurable material, uncured second photocurable material or combinations thereof.

25. A method of making an optical device comprising:

disposing two optical waveguides in mutually facing relation at a desired distance apart, the optical waveguides being configured for single-mode optical transmission;

disposing between the two optical waveguides a low shrinkage mixture comprising a first photocurable material, a second photocurable material, a binder material, a first photbcuring catalyst active at a first wavelenght, and a second photocuring catalyst active at a second wavelength different from the first wavelength;

forming a dimensionally stable film by partially curing the low shrinkage mixture which includes a binder material, a first photocurable material, a second photocurable material, a first photocuring catalyst active at a first wavelength, and a second photocuring catalyst active at a second wavelength different from the first wavelength;

wherein at least a portion of the photocurable materials remain unreacted alter the formation of the optical device and wherein the binder material is a hydroxy-terminated poly(butylene-1,4-cyclohexane dicarboxylate), a hydroxy-terminated poly(cyclohexane dimethyl hexahydro-4-methylphthalate), or combinations thereof.

\* \* \* \* \*

UNITED STATES PATENT AND TRADEMARK OFFICE
CERTIFICATE OF CORRECTION

PATENT NO. : 7,541,391 B2
APPLICATION NO. : 11/218847
DATED : June 2, 2009
INVENTOR(S) : Gorczyca et al.

It is certified that error appears in the above-identified patent and that said Letters Patent is hereby corrected as shown below:

In Column 4, Line 8, delete "bethermoplastic," and insert -- be thermoplastic, --, therefor.

In Column 11, Line 25, delete "voer" and insert -- over --, therefor.

In Column 11, Line 65, in Claim 3, delete "material" before "comprising".

In Column 12, Line 11, in Claim 5, delete "4-epoxycyclohexa necarboxylate," and insert -- 4-epoxycyclohexanecarboxylate, --, therefor.

In Column 12, Line 36, in Claim 6, delete "arouos:" and insert -- groups; --, therefor.

In Column 13, Line 31, in Claim 17, delete "groups:" and insert -- groups; --, therefor.

In Column 13, Line 42, in Claim 18, delete "first," and insert -- first --, therefor.

In Column 13, Line 58, in Claim 18, delete "hydroxy-term mated" and insert -- hydroxy-terminated --, therefor.

In Column 14, Line 9, in Claim 22, delete "groups:" and insert -- groups; --, therefor.

In Column 14, Line 31, in Claim 23, delete "index" and insert -- index, --, therefor.

In Column 15, Line 5, in Claim 24, delete "methylohthalate)," and insert -- methylphthalate), --, therefor.

In Column 15, Line 8, in Claim 24, delete "material" and insert -- material, --, therefor.

In Column 15, Line 17, in Claim 25, delete "photbcuring" and insert -- photocuring --, therefor.

In Column 15, Line 17, in Claim 25, delete "wavelenght," and insert -- wavelength, --, therefor.

In Column 16, Line 10, in Claim 25, delete "alter" and insert -- after --, therefor.

UNITED STATES PATENT AND TRADEMARK OFFICE
CERTIFICATE OF CORRECTION

PATENT NO. : 7,541,391 B2
APPLICATION NO. : 11/218847
DATED : June 2, 2009
INVENTOR(S) : Gorczyca et al.

It is certified that error appears in the above-identified patent and that said Letters Patent is hereby corrected as shown below:

In Column 16, Line 11, in Claim 25, delete "device" and insert -- device; --, therefor.

Signed and Sealed this

Third Day of November, 2009

David J. Kappos
*Director of the United States Patent and Trademark Office*